June 21, 1938.   R. E. POWERS   2,121,609
PHASE SEQUENCE APPARATUS
Filed Nov. 20, 1936
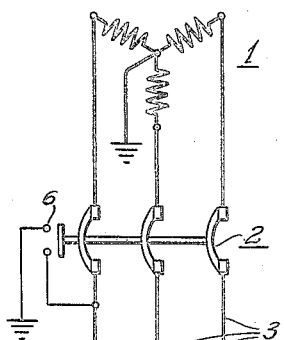
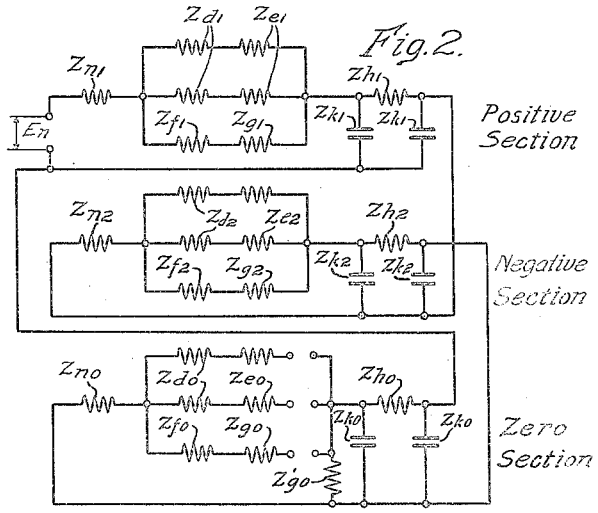
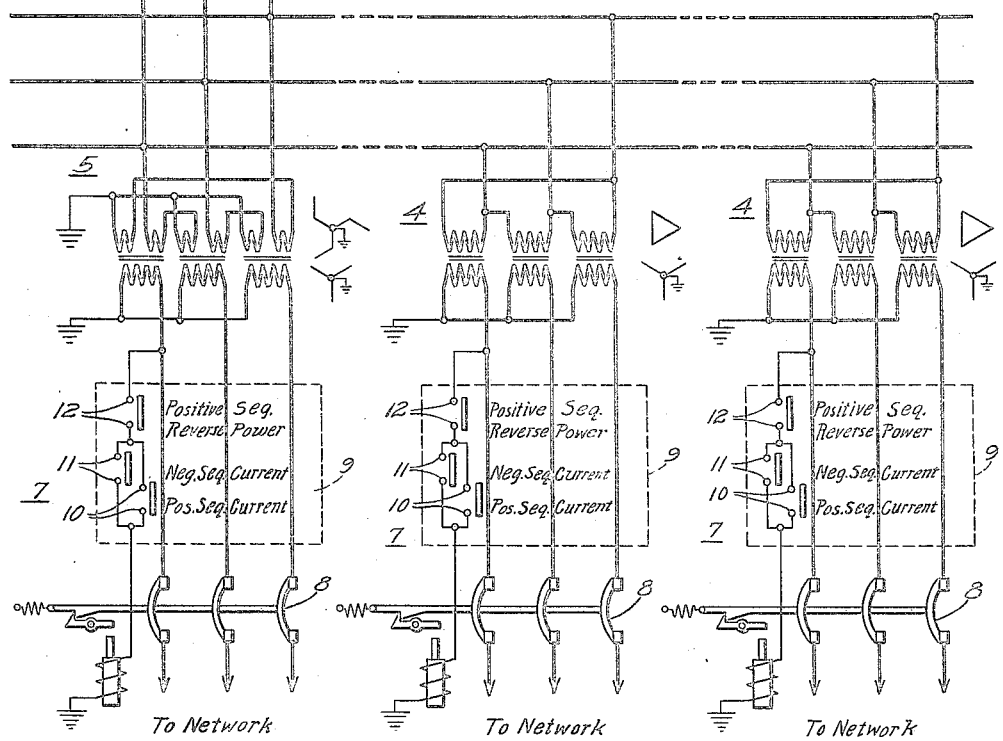
WITNESSES:
INVENTOR
Rolla E. Powers.
BY
ATTORNEY Patented June 21, 1938

2,121,609

UNITED STATES PATENT OFFICE 2,121,609

PHASE SEQUENCE APPARATUS

Rolla E. Powers, Westfield, N. J., assignor to Westinghouse Electric & Manufacturing Company, East Pittsburgh, Pa., a corporation of Pennsylvania Application November 20, 1936, Serial No. 111,860

11 Claims. (Cl. 171—97)

My invention relates to polyphase alternating-current apparatus, and particularly to such apparatus in which an unbalanced current variable, such as the negative symmetrical component of polyphase current, is utilized for the control of a relay or other electroresponsive device. Although the invention in its broader aspects is applicable generally to devices responsive to negative sequence current, it has particular application to phase sequence protective apparatus of the type described in U. S. Patent No. 2,042,-187, granted May 26, 1936 to R. E. Powers and H. R. Searing and assigned to Westinghouse Electric & Manufacturing Company.

In the above-mentioned Powers and Searing patent, there is disclosed a network distribution system in which the network protectors are provided with phase sequence relays so designed that the network protectors connected to any feeder may all be opened by opening the feeder breaker and establishing a negative sequence current flow of suitable magnitude on the feeder. As a means for establishing the negative sequence current flow required for this operation, one conductor of the polyphase feeder circuit is commonly grounded, so that the charging current drawn by the feeder becomes unbalanced, and a negative sequence current component flows in the feeder.

It has been found in practice that the expedient of grounding one feeder conductor produces sufficient negative sequence current for operation of the protectors, if the feeder voltage and cable capacitance are sufficient to produce a relatively large charging current, but that in some applications reliable operation cannot be assured without the addition of some device for increasing the negative sequence current flow in the feeder.

As network systems are commonly installed, the feeders are underground cables supplied from enclosed, compound-insulated buses in the power station or substation, and the network transformers and protectors are mounted in comparatively small underground vaults. Because of the inaccessibility of the feeder conductors in such a system, auxiliary apparatus, such as required to augment the feeder negative sequence current, can be installed only at considerable expense.

It is an object of my invention to provide a novel means for producing negative sequence current in network systems, which will require no apparatus additional to that provided for the normal distribution of power.

Another object of my invention is to provide a novel means for producing negative sequence current, which will be of general utility in alternating-current systems of transmission and distribution.

Other objects of my invention will become evident from the following detailed description taken in conjunction with the accompanying drawing, in which Figure 1 is a diagrammatic view of a portion of a network distribution system embodying my invention; and, Fig. 2 is a phase-sequence impedance diagram of the circuit shown in Fig. 1.

Referring to Fig. 1 of the drawing, a polyphase grounded-neutral alternating current source 1 is arranged to be connected, by means of a feeder circuit breaker 2, to a polyphase feeder 3. The feeder 3 is connected to a plurality of network transformers 4, having ungrounded delta-connected primary windings and grounded-neutral star-connected secondary windings, in accordance with the prevailing practice. In accordance with my invention, a special grounding transformer installation 5, having grounded-neutral interconnected star (zig-zag) primary windings, and grounded-neutral star-connected secondary windings is connected to the feeder 3 in parallel relationship to the delta-star transformer installations 4. The grounding transformer 5 serves the same function as the transformers 4 in supplying load, and also serves to produce negative sequence current flow in the feeder 3, in a manner to be explained below.

Suitable apparatus is provided for grounding one conductor of the feeder 3 when the feeder circuit breaker 2 is open. For convenience of illustration, such apparatus is shown as back contacts 6 of the feeder breaker 2, but may be of other forms suitable for this application, as will be obvious to those skilled in the art.

Although only three transformer installations are shown connected to the feeder 3, it will be understood that, in practice, each feeder would be connected to supply one zig-zag-star installation, and a relatively large number, such as 15 or 20, delta-star installations. Each installation, whether delta-star or zig-zag-star, may comprise a single polyphase transformer or a bank of single-phase transformers.

The grounding transformer 5, whether a polyphase or a bank of three single-phase transformers, has three separate magnetic circuits, upon each of which are mounted two primary windings and a secondary winding. This transformer is designed so that the mutual impedances between each of the primary windings and the associated secondary windings are all equal. The leakage impedances of the primary windings are also, preferably, made equal and of suitable value to limit the negative sequence current when one feeder conductor is grounded, in a manner to be explained below.

The secondary windings of the transformers 4 and 5 are arranged to be connected to a low-voltage interconnected network (not shown) by means of individual network protectors 7. The network is supplied by means of other feeders and transformer banks (not shown) in accordance with the usual practice.

As the present invention relates principally to the production of negative sequence current, the network protectors 7 may be of any type involving response to this variable, several forms of such network protectors being known in the art. As a concrete example of such network protectors, it will be assumed that the protectors 7 are of the type disclosed in the above-mentioned Patent No. 2,042,187, of Powers and Searing.

Each network protector 7 comprises an electrically-reclosed circuit breaker 8, and suitable control apparatus 9 for effecting the opening thereof when power flows in reverse direction from the network to the feeder 3, and for effecting the closing of the circuit breaker 8 when the relationship of voltages across the open circuit breaker 8 is such that power will flow from the feeder 3 to the network upon closure of the breaker. Inasmuch as the present invention does not involve the closing operation of the network circuit breakers 8, nor the operation of any specific relays of the control apparatus 9, the apparatus involved in such operations has been omitted from the drawing and description. A complete disclosure of the omitted apparatus and an explanation of its operation are contained in the above-mentioned patent of Powers and Searing.

For purposes of the present invention, it is sufficient to state that the tripping circuit of each network circuit breaker 8 includes parallel connected contacts 10 and 11, of a positive sequence overcurrent relay and a negative sequence overcurrent relay, respectively, and includes the contacts 12, of a positive sequence reverse power relay. The reverse positive sequence power contacts 12 close in response to a comparatively small reverse power flow, such as caused by the magnetizing losses of the corresponding transformer bank 4 or 5, when the feeder circuit breaker 2 is open. The contacts 12 also close in response to the heavy reverse power flow caused by a fault on the feeder 3 or in the high-voltage windings of one of the network transformers 4 or 5.

The positive sequence overcurrent contacts 10 close in response to positive sequence current flow greater than that caused by magnetizing current of the associated transformer bank 4 or 5, but less than that which exists during a fault. As an illustration, the contacts 10 may close at a positive sequence current corresponding to 100% of the rating of the associated transformer bank 4 or 5. The negative sequence overcurrent contacts 11 close at a value of negative sequence current somewhat less than that which traverses the associated transformer bank 4 or 5 when the feeder breaker 2 is opened and a ground on one feeder conductor established thereby. This value may be of the order of 2% of rated full load current of the associated transformer bank, for example.

The operation of the above-described apparatus may be set forth as follows: With the feeder breaker 2 and network breakers 8 closed, as shown, power is supplied from the source 1 through the network transformers 4 and 5 to the network.

If a fault occurs on the network, the positive and negative sequence contacts 10 and 11 of each network protector 7 close in response to the heavy current. However, the directional contacts 12 remain open, as the power flow is toward the network, and tripping of the network protectors 7 is, accordingly, prevented. The network fault is burned off in the usual manner.

If a fault occurs on the feeder 3, the direction of power flow reverses and the directional contacts 12 of each protector 7 close. As the current flow is of fault magnitude, one or both sets of overcurrent contacts 10 or 11 close to complete a trip circuit for the associated network circuit breaker 8. The network circuit breakers 8, accordingly, trip open. The feeder breaker 2 also trips open, under these conditions, in response to the operation of its associated fault-responsive apparatus (not shown) thereby clearing the faulted feeder.

With the feeder breaker 2 and the network circuit breakers 8 closed, as shown, the feeder 3 may be removed from service by manually opening the feeder circuit breaker 2. Upon opening of the feeder breaker 2, the magnetizing losses of the transformer banks 4 and 5 are supplied in reverse direction from the network, and the directional contacts 12 of each protector close. The transformer banks 4 and 5, under these conditions, serve as a source of polyphase alternating voltage to maintain the feeder 2 energized, even though the latter is disconnected from the grounded-neutral alternating-current source 1. As the transformer secondary current consists only of a transformer magnetizing component and a cable charging component, the positive sequence overcurrent contacts 10 of each protector remain open.

The ground on one feeder conductor, caused by the back contacts 6 of feeder breaker 2, causes current to flow from the network through the transformers 4 and 5, in parallel, and through the feeder 3 to the ground connection. Because of the interconnected-star connection of the primary windings of transformer bank 5, the positive, negative and zero sequence components of current to the ground connection are increased, and sufficient negative sequence current is available to cause closure of the negative sequence overcurrent contacts 11 of each protector 7. The network circuit breakers 8, accordingly, trip open.

The manner in which negative sequence current is made available by the interconected-star transformer connection, may better be understood by reference to Fig. 2, which is a phase sequence impedance diagram of the system with the network circuit breakers 8 closed and the feeder breaker 2 open, establishing a ground on one conductor of the feeder 3.

The diagram of Fig. 2, consists of three sections representing, respectively, the positive, negative and zero phase sequence impedances of the system, considering the network as the source. Each element having impedance appears in all three diagrams, the three symbols representing the positive, negative and zero sequence impedance of the element, respectively. For example, the series impedance of feeder 3 is designated $Z_{h1}$ in the positive section, $Z_{h2}$ in the negative section and $Z_{h0}$ in the zero section. The significance of the various impedance symbols is as follows:

$\left.\begin{array}{l}Z_{n1}\\Z_{n2}\\Z_{n0}\end{array}\right\}$ Impedance of the network $\left.\begin{array}{l}Z_{d1}\\Z_{d2}\\Z_{d0}\end{array}\right\}$ Impedance of the leads to the delta-star transformers 4

$\left.\begin{array}{l}Z_{e1}\\Z_{e2}\\Z_{e0}\end{array}\right\}$ Impedance of the windings of the delta-star transformers 4

$\left.\begin{array}{l}Z_{f1}\\Z_{f2}\\Z_{f0}\end{array}\right\}$ Impedance of the leads to the zig-zag-star transformers 5

$\left.\begin{array}{l}Z_{g1}\\Z_{g2}\\Z_{g0}\end{array}\right\}$ Impedance of the windings of the zig-zag-star transformers 5

$\left.\begin{array}{l}Z_{h1}\\Z_{h2}\\Z_{h0}\end{array}\right\}$ Series impedance of the feeder 3

$\left.\begin{array}{l}Z_{k1}\\Z_{k2}\\Z_{k0}\end{array}\right\}$ Charging impedance of the feeder 3, represented as an equivalent $\pi$ circuit.

As the current flowing to ground through the contacts 6 traverses only one conductor of the feeder 3, and as the feeder charging admittance is relatively small as compared to the admittance to ground of the zig-zag transformer 5, the positive, negative and zero sequence current components may be considered equal. The three impedance sections are accordingly considered as connected in series at the point where the components are equal, in accordance with the usual practice in calculating electrical networks on the phase sequence principle.

It will be noted that the zero sequence section is shown as open circuited at the impedances $Z_{e0}$, corresponding to the delta-star transformers 4. This open circuit results from the well-known effect of the delta, which prevents the passage of zero sequence current.

The interconnected-star circuit of the grounding transformer 5 also prevents the passage of zero sequence current from primary to secondary or vice versa, as indicated by an open circuit adjacent the series component of zero sequence impedance $Z_{g0}$. In the case of the grounding transformer 5, however, a shunt path for zero sequence current exists, as indicated by the impedance $Z'_{g0}$. By making the zero sequence shunt impedance $Z'_{g0}$ small, in a maner to be explained below, the value of positive, negative and zero sequence current flowing through the ground connection can be made as large as desired, within the rated capacity limits of the grounding transformer 5.

As zero sequence currents are equal and in phase in all three phase conductors, it may be seen from Fig. 1, that zero sequence current flowing from the feeder 3 into the primary windings of transformer 5 produces two bucking magnetomotive forces in each core of the transformer. As the mutual impedances of all of the primary windings of transformer 5 with respect to their associated secondary windings are equal, the bucking magnetomotive forces in each core are equal. The zero sequence mutual impedance between primary and secondary of the transformer 5 as a whole, is therefore zero. The magnitude of zero sequence current flow in the primary of transformer 5, for a given zero sequence voltage, accordingly, is limited only by the leakage reactance of the primary windings. By making this reactance small, the negative sequence current flow may be made as large as desired.

Referring to Fig. 2, as the charging impedances $Z_{k1}$, $Z_{k2}$ and $Z_{k0}$ are large and all series impedances relatively small, it will be seen that the current flow through the positive, negative and zero sequence sections in series is limited principally by the zero sequence shunt impedance $Z'_{g0}$ of the grounding transformer 5. The negative sequence current flow is accordingly determined by the design of the grounding transformer 5.

It will be noted that although the interconnected-star circuit of transformer 5 causes the mutual impedance between primary and secondary polyphase circuits to become zero for zero phase sequence quantities, the mutual impedance for positive and negative sequence quantities remains high. The positive and negative sequence shunt or leakage impedances of the primary circuit of transformer 5, accordingly, remain so high that their effects may be neglected. The corresponding shunts in the positive and negative sections of Fig. 2 are, accordingly, omitted.

I do not intend that the present invention shall be restricted to the specific structural detail, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. The method of producing unbalanced current flow between an ungrounded source of polyphase alternating voltage and a polyphase alternating-current circuit connected thereto, which comprises establishing a connection of relatively low zero-sequence impedance from said circuit to ground, and establishing a connection of one phase conductor of said circuit to ground.

2. The method of producing negative sequence current flow between an ungrounded source of polyphase alternating voltage and a polyphase alternating-current circuit connected thereto, which comprises establishing a ground connection to one phase conductor of said circuit, and establishing an impedance connection of a plurality of phases of said circuit to ground such as to cause the flow of zero sequence current from said source through said ground connection.

3. In combination, a polyphase alternating-current circuit, and a source of negative sequence current therefor comprising impedance means connecting all phase conductors of said circuit to ground, said impedance means having relatively high positive sequence impedance and relatively low zero sequence impedance to ground, and switch means for connecting one phase conductor of said circuit to ground.

4. In combination, a polyphase alternating-current circuit, and a source of negative sequence current therefor comprising inductance means having two windings for each phase of said circuit, said windings being connected in pairs in circuits connecting the phase conductors of said alternating-current circuit and ground, one winding of each of said pairs being in mutual inductive relationship with a winding of the next succeeding pair in a predetermined rotative sequence, and conducting means for connecting one phase conductor of said circuit to ground.

5. In an alternating-current system of transmission and distribution, a polyphase power circuit, a device responsive to negative sequence current supplied to said circuit, and means for causing operation of said device upon grounding of one conductor of said circuit comprising inductance means having two windings for each phase of said power circuit, said windings being connected in pairs in circuits connecting the phase conductors of said power circuit and ground, one winding of each of said pairs being in mutual inductive relationship with a winding of the next succeeding pair in a predetermined rotative sequence.

6. In an alternating-current network system of distribution, a polyphase alternating-current feeder circuit, a feeder circuit breaker in said feeder circuit, a polyphase network circuit, a plurality of polyphase transformer means having ungrounded windings connected to said feeder circuit and having low-voltage polyphase connections to said network circuit, a plurality of devices responsive to negative sequence current traversing said transformer means, and means for causing operation of said devices upon grounding of said feeder circuit comprising inductance means having two windings for each phase of said feeder circuit, said windings being connected in pairs in circuits connecting the phase conductors of said feeder circuit and ground, one winding of each of said pairs being in inductive relationship with a winding of the next succeeding pair in a predetermined rotative sequence.

7. In an alternating-current network system of distribution, a polyphase alternating-current feeder circuit, a feeder circuit breaker in said feeder circuit, a polyphase network circuit, means effective when said feeder circuit breaker is open for artificially grounding one conductor of said feeder circuit, a plurality of polyphase transformer means having ungrounded windings connected to said feeder circuit and having low-voltage polyphase connections to said network circuit, a plurality of devices responsive to negative sequence current traversing said transformer means, and means for causing operation of said devices upon the opening of said feeder circuit breaker comprising inductance means having two windings for each phase of said feeder circuit, said windings being connected in pairs in circuits connecting the phase conductors of said feeder circuit and ground, one winding of each of said pairs being in inductive relationship with a winding of the next succeeding pair in a predetermined rotative sequence.

8. In an alternating-current network system of distribution, a polyphase alternating-current feeder circuit, a feeder circuit breaker in said feeder circuit, a polyphase network circuit, means effective when said feeder circuit breaker is open for artificially grounding one conductor of said feeder circuit, a plurality of polyphase transformer means having ungrounded windings connected to said feeder circuit and having low-voltage polyphase connections to said network circuit, a plurality of devices responsive to negative sequence current traversing said transformer means, and means for causing operation of said devices upon the opening of said feeder circuit breaker comprising network transformer means having star-connected low voltage windings with neutral grounded and having two high voltage windings for each phase of said feeder circuit, said windings being connected in pairs in circuits connecting the phase conductors of said feeder circuit and ground, one winding of each of said pairs being in inductive relationship with a winding of the next succeeding pair in a predetermined rotative sequence.

9. In an alternating-current network system of distribution, a polyphase alternating-current feeder circuit, a feeder circuit breaker in said feeder circuit, a polyphase network circuit, means effective when said feeder circuit breaker is open for artificially grounding one conductor of said feeder circuit, a plurality of polyphase transformer means having ungrounded windings connected to said feeder circuit and having low-voltage polyphase connections to said network circuit, a plurality of devices responsive to negative sequence current traversing said transformer means, and means for causing operation of said devices upon the opening of said feeder circuit breaker comprising network transformer means having low-voltage windings connected in suitable relationship for three-phase four-wire load service and having high-voltage windings connected to said feeder circuit in interconnected-star relationship with neutral grounded.

10. In an alternating-current network system of distribution, a polyphase alternating-current feeder circuit, a feeder circuit breaker in said feeder circuit, a polyphase network circuit, means effective when said feeder circuit breaker is open for artificially grounding one conductor of said feeder circuit, a plurality of polyphase transformer means having ungrounded windings connected to said feeder circuit and having low-voltage polyphase connections to said network circuit, a plurality of devices responsive to negative sequence current traversing said transformer means, and means for causing operation of said devices upon the opening of said feeder circuit breaker comprising network transformer means having low-voltage windings connected in suitable relationship for three-phase four-wire load service and having high-voltage windings connected to said feeder circuit in interconnected-star relationship with neutral grounded, said network transformer means being designed so that said high-voltage windings provide relatively high positive sequence impedance and relatively low zero sequence impedance.

11. In an alternating-current network system of distribution, a polyphase alternating-current feeder circuit, a feeder circuit breaker in said feeder circuit, a polyphase network circuit, means effective when said feeder circuit breaker is open for artificially grounding one conductor of said feeder circuit, a plurality of polyphase transformer means having ungrounded windings connected to said feeder circuit and having low-voltage polyphase connections to said network circuit, a plurality of devices responsive to negative sequence current traversing said transformer means, and means for causing operation of said devices upon the opening of said feeder circuit breaker comprising network transformer means having low-voltage windings connected in suitable relationship for three-phase four-wire load service and having high-voltage windings connected to said feeder circuit in interconnected-star relationship with neutral grounded, said network transformer means being designed so that the leakage impedance of said high voltage windings is sufficiently low to permit the flow of sufficient negative sequence current for operation of said devices when said feeder circuit breaker is open.

ROLLA E. POWERS.